US010071901B2

(12) United States Patent
Gros

(10) Patent No.: US 10,071,901 B2
(45) Date of Patent: Sep. 11, 2018

(54) SAFETY ILLUMINATION DEVICE FOR A HORSE

(71) Applicant: TAIL LIGHTS, INC., Woodland Hills, CA (US)

(72) Inventor: Jennifer Anne Gros, Woodland Hills, CA (US)

(73) Assignee: Tail Lights, Inc., Woodland Hills, CA (US)

( * ) Notice: Subject to any disclaimer, the term of this patent is extended or adjusted under 35 U.S.C. 154(b) by 0 days.

(21) Appl. No.: 14/176,044

(22) Filed: Feb. 7, 2014

(65) Prior Publication Data

US 2014/0218907 A1 Aug. 7, 2014

Related U.S. Application Data

(60) Provisional application No. 61/762,285, filed on Feb. 7, 2013.

(51) Int. Cl.
*A01K 27/00* (2006.01)
*B68B 5/00* (2006.01)
*A01K 11/00* (2006.01)
*F21V 21/00* (2006.01)

(52) U.S. Cl.
CPC ............ *B68B 5/00* (2013.01); *A01K 11/00* (2013.01); *A01K 27/006* (2013.01); *F21V 21/00* (2013.01)

(58) Field of Classification Search
CPC .... A01K 13/005; A01K 11/00; A01K 11/006; A01K 27/006

USPC .................................................. 362/103–105
See application file for complete search history.

(56) References Cited

U.S. PATENT DOCUMENTS

| | | | |
|---|---|---|---|
| 2,079,053 A * | 5/1937 | Torbert, Jr. ........................ 54/1 |
| 3,900,981 A * | 8/1975 | Nichols .................. A01K 11/00 40/300 |
| 4,604,760 A * | 8/1986 | Coin ............................ 2/209.13 |
| 6,302,554 B1 * | 10/2001 | Holce ............................ 362/84 |
| 7,011,427 B1 | 3/2006 | Baez |
| 7,431,471 B1 * | 10/2008 | Wade ............................ 362/103 |
| 8,240,869 B2 | 8/2012 | Johnson et al. |
| 2004/0163660 A1 * | 8/2004 | Kellmann ..................... 132/201 |
| 2005/0044823 A1 * | 3/2005 | Collins ........................... 54/6.1 |
| 2007/0086182 A1 * | 4/2007 | Kelly ............................ 362/108 |
| 2009/0067159 A1 | 3/2009 | Beneski et al. |

OTHER PUBLICATIONS

International Search Report for PCT/US2014/15436 dated May 29, 2014, 1 pg.

* cited by examiner

*Primary Examiner* — Alexander Garlen
(74) *Attorney, Agent, or Firm* — Manatt, Phelps & Phillips LLP

(57) ABSTRACT

An illumination device capable of being mounted to a horse's tail, mane, or other parts of the horse, for alerting an observer of the presence of the horse. The illumination device includes one or more strands of lights in a parallel arrangement.

8 Claims, 8 Drawing Sheets

SAFETY ILLUMINATION DEVICE FOR A HORSE

CROSS-REFERENCE TO RELATED APPLICATIONS

This application claims the benefit of U.S. Provisional Application No. 61/762,285, filed on Feb. 7, 2013, the contents of which are incorporated by reference as if fully set forth herein.

FIELD OF THE INVENTION

The present invention generally relates to equestrian equipment. More particularly, preferred embodiments of the invention relate to a safety illumination device and system for a horse.

BACKGROUND OF THE INVENTION

At night or during adverse weather, horses and riders do not have adequate illumination to protect themselves against traffic. Current safety garments and devices use reflectors that are placed on the legs, or tack of the horse. Reflectors, however, are dependent on an external light source to illuminate the rider and/or horse. If the reflector is at an angle, if the automobile does not have both headlights, or if the angle of the light is not exactly optimal, reflectors will fail to adequately reflect light back to an observer. Reflectors are often placed on the legs near the hooves of a horse, much lower than the average line of sight for drivers.

There is a need for an improved illumination system for horses.

BRIEF SUMMARY OF PREFERRED EMBODIMENTS OF THE INVENTION

A preferred embodiment of the invention includes an illumination device capable of being mounted to a horse's tail, mane, or other parts of the horse, for alerting an observer of the presence of the horse. A battery-powered light source mounted to a horse may provide superior performance in adverse lighting and weather conditions to allow vehicles to see the horse and rider more optimally than current, reflector-based products. The illumination device includes one or more strands of lights in a parallel arrangement. In a preferred embodiment, the strands of light are joined together by a mounting unit having a join to which each strand is affixed. Each strand includes circuitry that is coupled to a power source. In a preferred embodiment, the circuitry of the strands are coupled to a controller for controlling the illumination of the strands.

Additional features, advantages, and aspects of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Figure 1:
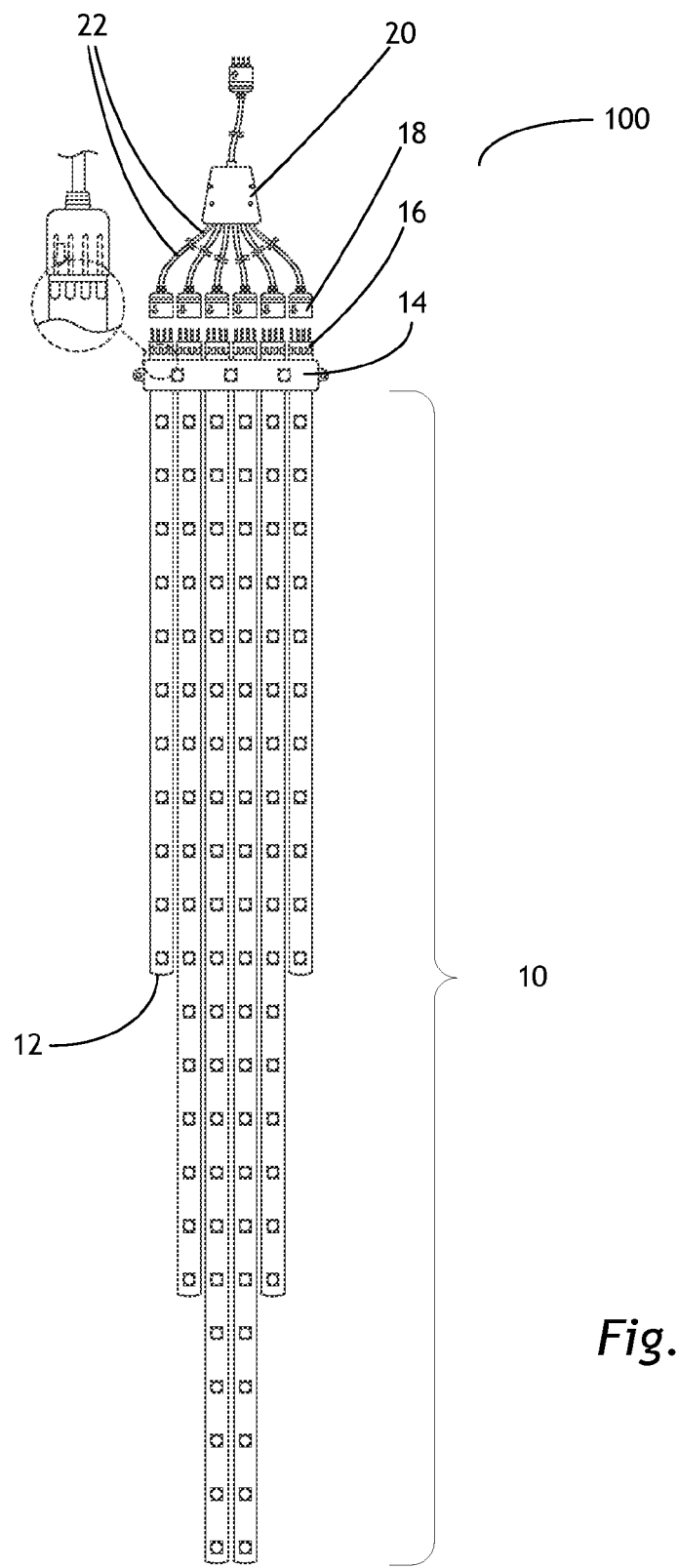
FIG. 1 is a diagrammatic view of a safety illumination device for a horse constructed in accordance with embodiments of the invention.

The aspects of the present disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the present disclosure. The examples used herein are intended merely to facilitate an understanding of ways in which the present disclosure may be practiced and to further enable those of skill in the art to practice the aspects of the present disclosure. Accordingly, the examples and aspects herein should not be construed as limiting the scope of the present disclosure, which is defined solely by the appended claims and applicable law. Moreover, it is noted that like reference numerals represent similar parts throughout the drawings.

FIG. 1 illustrates an example a safety illumination device 100 that includes light source 10. Light source 10 may be, for example, group of one or more illumination units, each unit having a series of light-emitting diodes (LEDs) configured in an elongated form, such as a strip, string, or rope configuration, hereinafter referred to as a rope light, such as rope light 12. Light source 10 may comprise one or more rope lights. For example, light source 10 may include six light ropes joined together by a join, such as join 14. As shown in the example of FIG. 1, join 14 holds the rope lights in a parallel arrangement along a plane. In some embodiments, join 14 holds the rope lights in a curvilinear plane so that the rope lights may lie against a curvature of a tail or an animal's surface. According to some embodiments, the rope lights are made of a flexible plastic that is sufficiently stiff or rigid so as to avoid being tangled with other strands. In some embodiments, the separate strands allow separate movement of the strands when the lights are moved by movement of the horse's tail. While light source 10 is described herein as including separate strands of rope lights, it is understood by those in the art that light source 10 may include any configuration or structure of lights, including one or more plastic or fabric sheets with lights encased therein or attached thereto, or a connected net of lighting strands or strips.

Figure 2:
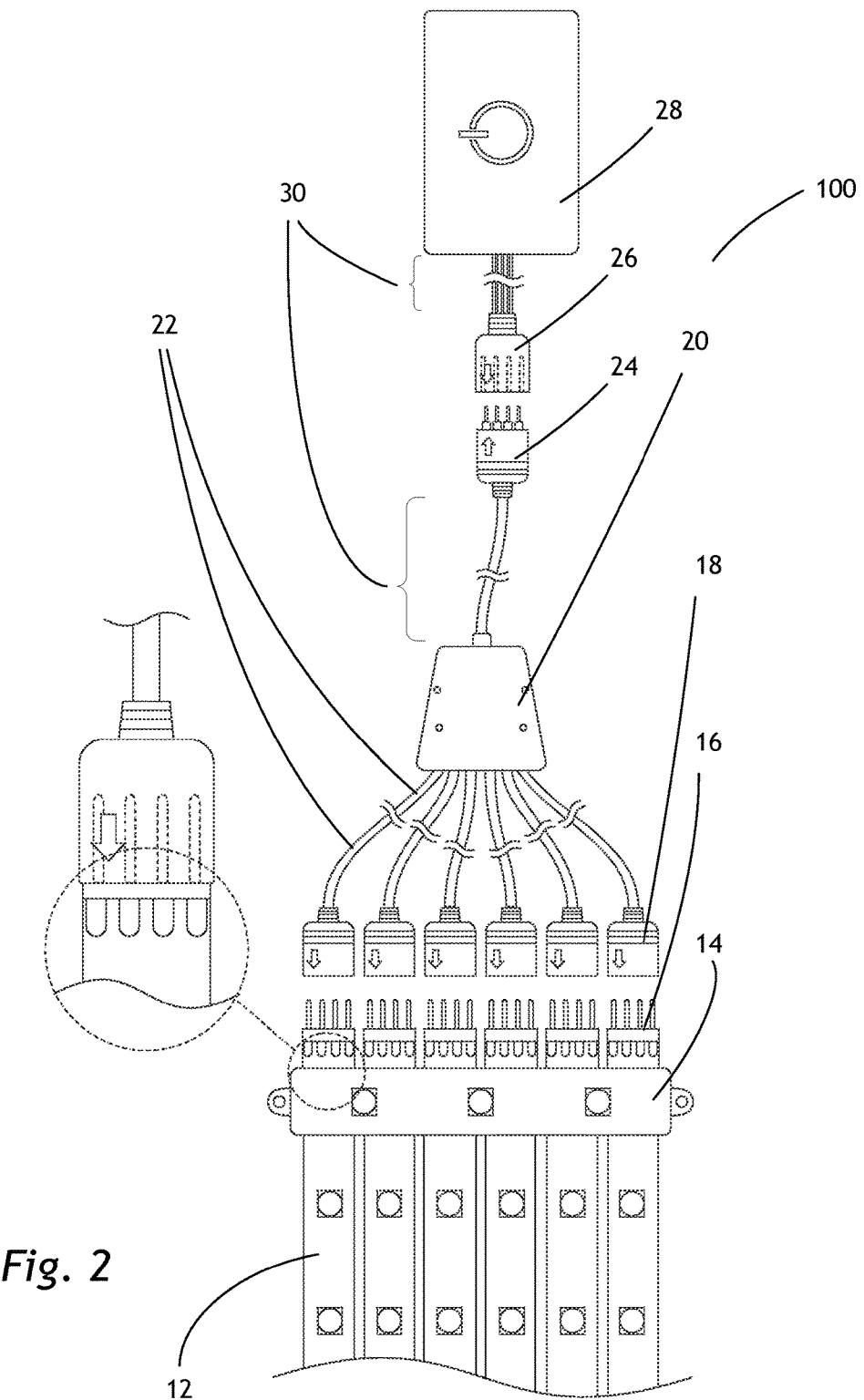
FIG. 2 is an enlarged diagrammatic view of a portion of the safety illumination device for a horse constructed in accordance with embodiments of the invention.

FIG. 2 illustrates an enlarged example of FIG. 1. According to some embodiments, each rope light, such as rope light 12, terminates in an electrical connector 16 coupled to a length of wiring 22 for coupling the rope light to a control module 20 by a socket, such as socket 18. The wiring includes communicative wiring and electrical wiring. The control module may house one or more printed circuit boards that are configured for controlling the rope lights, such as an LED light control circuit board. The control module is wired into connector 24 that is coupled communicatively and electrically to electrical box 28. In some embodiments, the control module is housed within the electrical box 28 and communicatively and electrically coupled to light source 10.

According to some embodiments, electrical box 28 includes a female electrical connector 26 and a control input, such as a switch or key (not shown). The control input may be an on/off switch, a multi-position switch, or one or more buttons or keys that electronically selects among modes for controlling the illumination of light source 10. Examples of controlling illumination includes providing a lighting pattern of light source 10. Possible patterns include, without limitation, solid on, flashing, undulating, cascading, and color variations. The electrical box is powered by a portable power source, without limitation to batteries, solar panels, or other components that provide power to the light source. The electrical wiring 30 disposed between the light source and the electrical box may vary in length to provide desired spacing between the electrical box and light source 10.

Figure 3:
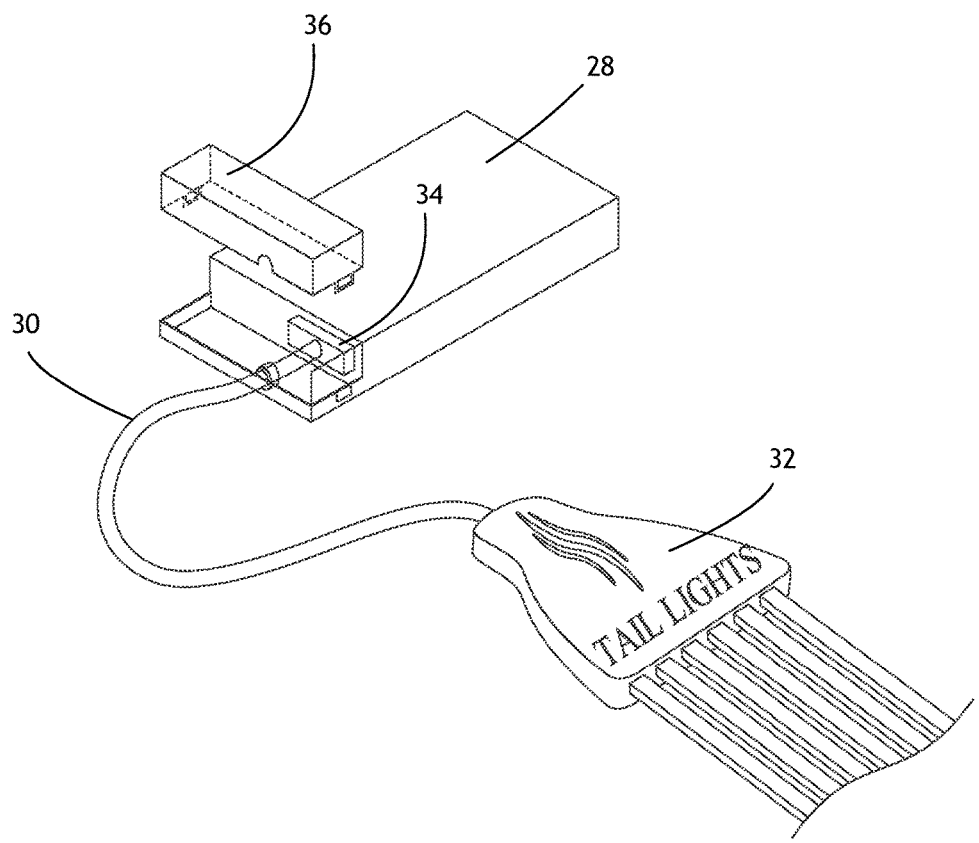
FIG. 3 is an enlarged diagrammatic view of a portion of the safety illumination device for a horse constructed in accordance with embodiments of the invention.

FIG. 3 illustrates an enlarged example of an illuminating device for a horse, according to some embodiments. In this example, housing 32 is applied to cover join 14, connector 16, socket 18, control module 20, and wiring 22 to provide water proofing or water resistance to the device. Electrical wiring 30 couples control module to electrical box 28. Electrical box 28 is configured to directly receive connector 34. In some embodiments, the junction of electrical wiring 30 is enclosed by a cover 36 to provide water proofing or water resistance to the device.

Figure 4:
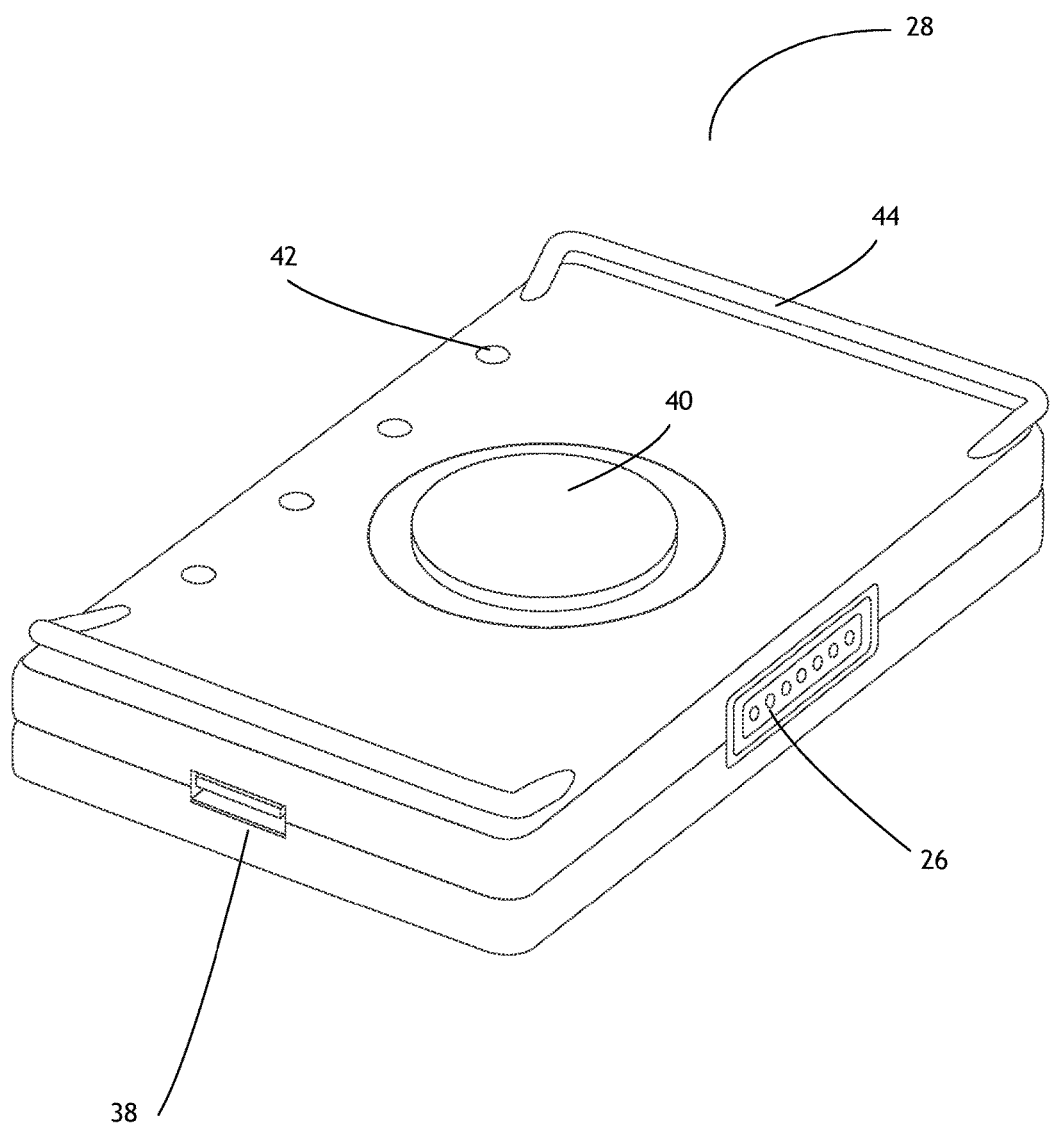
FIG. 4 is an enlarged diagrammatic view of a function control apparatus of the safety illumination device for a horse constructed in accordance with embodiments of the invention.

FIG. 4 illustrates an example of electrical box 28 according to some embodiments. In this example, electrical box 28 includes one or more sockets, including electrical connector 26 and socket 38, for communicatively and/or electrically coupling to light source 10. In this example, control button 40 is provided for selecting among modes for controlling the illumination of light source 10. It is understood by those of skill in the art that electrical box 28 may receive input signals from other sources, including wireless sources such as remote control, Bluetooth connectivity for smartphone control, or a wired input sources, such as wired remote control. Electrical box 28 may include status indicators, such as lights 42, for indicating the mode selected. It is understood by those of skill in the art that the status indicators may include a displays, such as a LCD or e-Ink display, for showing the status of operation without departing from the spirit of the invention. The electrical box 28 includes one or more brackets, loops, hooks, or other mounting structure, such as bracket 44, for mounting the box to a mounting site, such as a tail, a mane, a saddle or other horse-riding equipment, or onto the rider.

Figure 5:
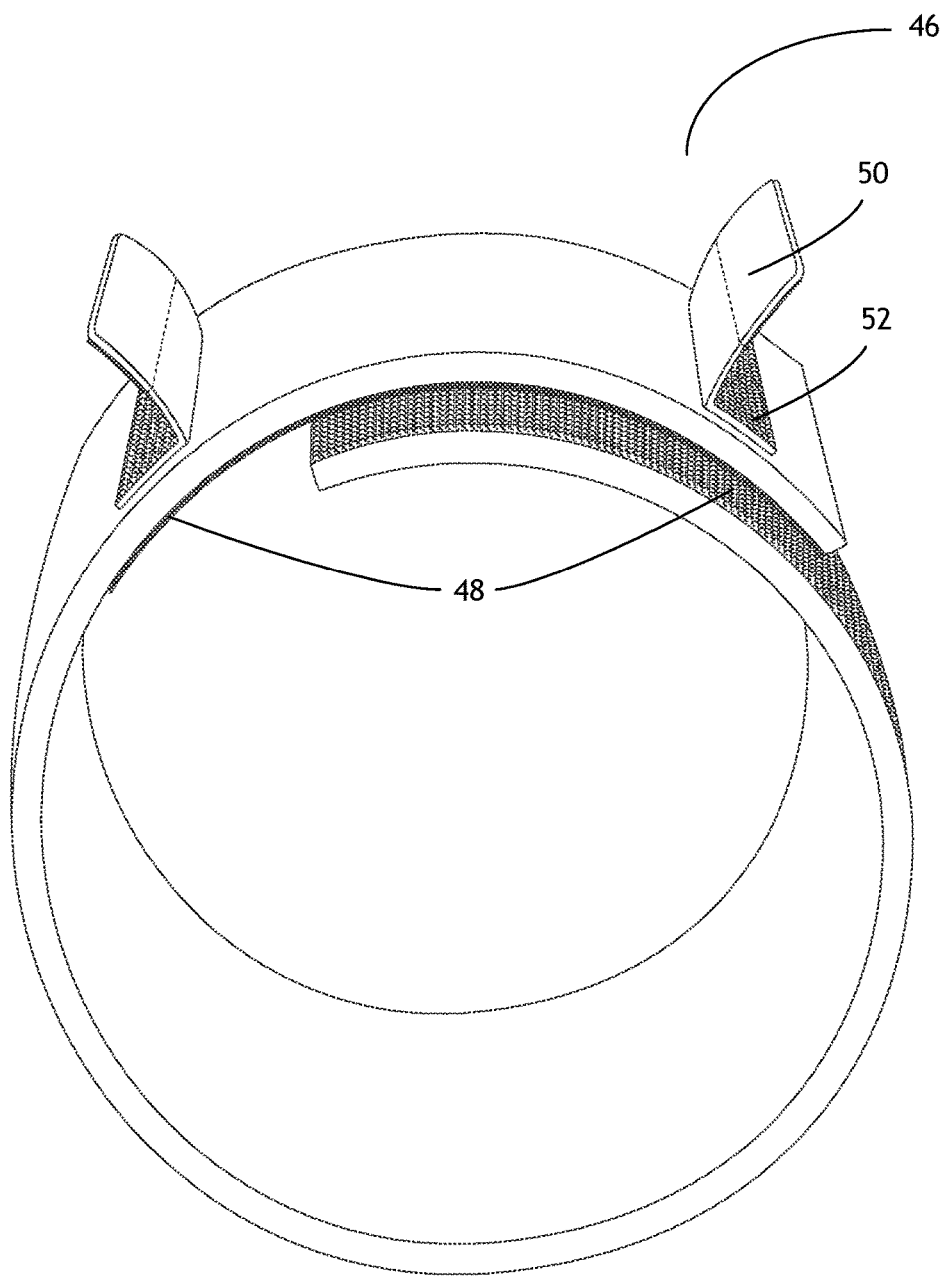
FIG. 5 is a diagrammatic view of a fastener of the safety illumination device for a horse constructed in accordance with embodiments of the invention.

FIG. 5 illustrates a base structure for affixing to a part of a horse that provides a base for mounting the illumination device 100. In this example, the base structure comprises a tail wrap 46 configured for affixing to a tail of a horse by wrapping the tail wrap securely around the tail, according to some embodiments. In this example, tail wrap comprises an elongated piece of fabric configured to attach to the base of a horse's tail using a closing mechanism, such as Velcro® (hook and loop fastening system) 48, straps, snaps, buckles on the ends of the fabric piece for securing the tail wrap around a horse's tail. The electrical box may be attached or affixed to the tail wrap using, e.g., Velcro®, snaps, buckles, and so on. In the example shown, tail wrap 46 includes one or more tabs 50 configured with a hook-and-loop fastening system 52 for looping through a mounting structure, such as bracket 44 in electrical box 28 as shown in FIG. 4, for mounting the illumination device thereto, such as via connecting to bracket 44 of electrical box 26. The tail wrap may be made of neoprene, cloth, fabric, leather, or the like. The electrical box may be attached to the saddle using clips, snaps, straps, or the like.

Figure 6:
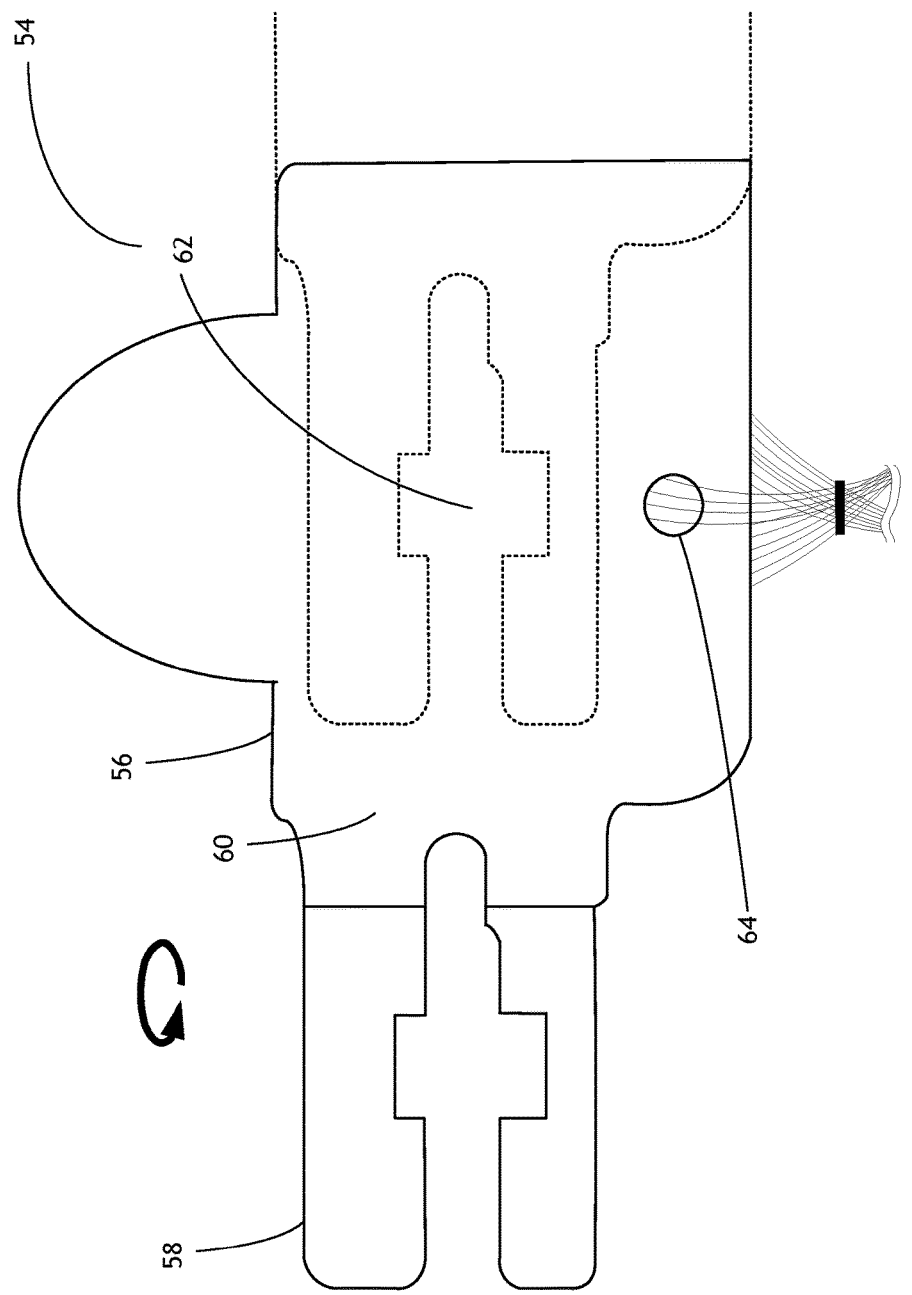
FIG. 6 is a diagrammatic view of a fastener of the safety illumination device for a horse constructed in accordance with embodiments of the invention.

FIG. 6 illustrates tail wrap 54 for configured for affixing to a tail of a horse by wrapping the tail wrap securely around the tail, according to some embodiments. In this example, tail wrap comprises primary structure 56, which includes a surface or portion of a surface 60 that comprises the loop portion (the "fuzzy," soft portion) of a hook-and-loop fastening system. Tail wrap 54 includes straps 58, the underside of which comprises the hook portion (the "rough" portion) of the hook and loop fastening system. When wrapped and secured around a structure, such as a horse's tail, the straps affix to the surface 60. Straps 58 are configured to allow some portion of surface 60 to be uncovered. In preferred embodiments, the uncovered surface 60, such as area 62, is of sufficient size for mounting the illumination device 100 by providing a hook surface on the underside of a portion of illumination device 100 for securely attaching to uncovered surface 60. For example, with reference to FIG. 3, the underside of housing 32 may include on its surface a hook portion of a hook and loop fastening system. In some embodiments, housing 32 is simply pressed against uncovered surface 60 on tail wrap 54 as attached to a portion of a horse or a rider, such as a horse's tail, to attach the illumination device 100 thereto.

With further reference to FIG. 6, tail wrap 54 includes aperture 64 configured to allow a number of horse tail hairs to be brought through for securing tail wrap in a fixed position on the tail. The horsetail hairs as brought through aperture 64 are braided to the hair below the wrap and secured with a security device, such as a clip or an elastic, for provide a stop against which tail wrap 54 would not slip past.

Figure 7:
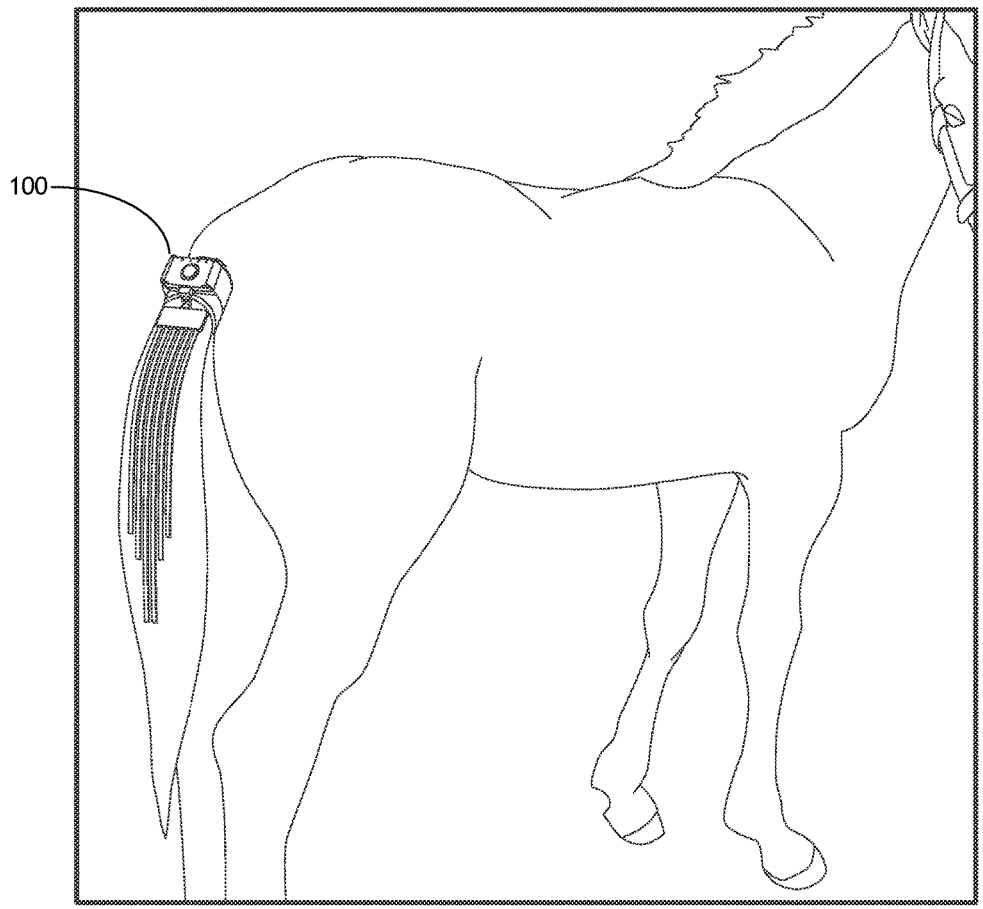
FIG. 7 is a diagrammatic view of the safety illumination device for a horse as affixed to the horse, in accordance with embodiments of the invention.

In some preferred embodiments, as shown in FIG. 7, the illumination device is affixed to the tail of the horse. The rope light may be braided into the horse's tail to create an aesthetically pleasing appearance while providing the enhanced safety of a self-illuminating device. The rope light strands may also be draped in a cascading fashion down the tail. Rope light strands, according to some embodiments, may be clipped to the horse's hair with one or more clips. In some embodiments, the clips may be associated with the rope light, such as by being glued or snapped to the rope light, or by being threaded or inserted through a slot in the covering or material of the rope light.

Figure 8:
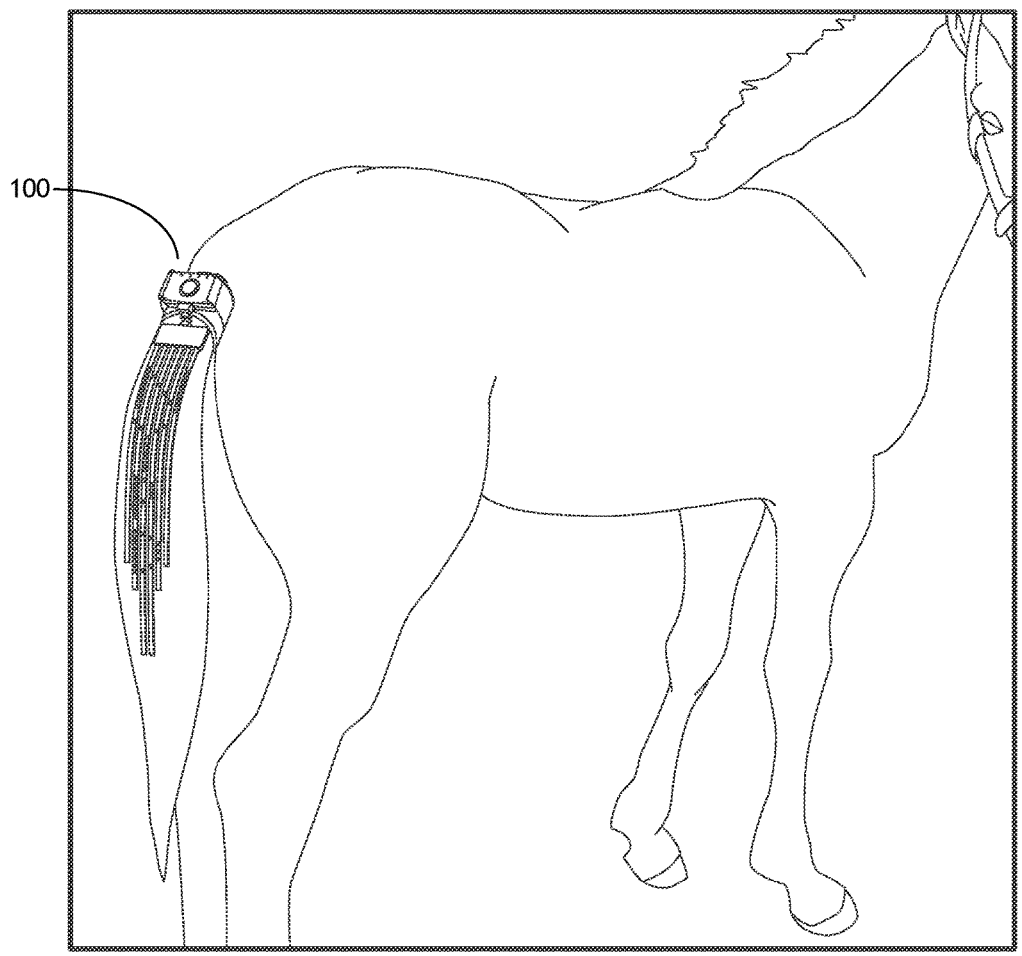
FIG. 8 is a diagrammatic view of the safety illumination device for a horse as affixed to the horse and illuminated according to a pattern, in accordance with embodiments of the invention.

In some preferred embodiments, as shown in FIG. 8, the illumination device is configured by control module to 20 to provide one or more lighting patterns, including, without limitation, patterns for spelling out words or letters, such as "NYPD."

According to an aspect of the present disclosure, an illumination device may also be used to provide safety lights for the mane of a horse. In this aspect, the tail wrap discussed above may be configured to attach to the horses bridle, and the and the electrical box may be attached either to the bridle or to the saddle. In some embodiments, rope light strands are draped along or braided into the horse's mane. Clips may be used to secure or attach the rope light to the horse's mane.

A safety illumination device or system may be used in non-equestrian capacities without departing from the spirit and scope of the present disclosure. For example, the devices described herein may be adapted for use in numerous other fields by the application of routine skill and experimentation. Safety lights may be produced for, e.g., wrapping around scuba tanks for diving at night or into areas with little to no illumination, such as caves or shipwrecks. Safety lights may also be placed on, e.g., strollers, bicycles, joggers, or the like. Safety lights may be used or produced for any activity where safety would be enhanced by the use of a bright, clip-on safety light. According to the present disclosure, a safety illumination device may use an internal battery power source to light the tail, mane, or both of a horse. The tail or mane may be illuminated in an attractive or aesthetically pleasing cascade of light. Thus, the illumination device may alert approaching traffic to the presence and position of the horse and rider. In addition it may provide a piece of wearable art. Light sources, such as those described for use with the safety illumination device, may provide superior performance to reflectors in adverse lighting conditions, including darkness and inclement weather. A powered light source may illuminate a horse and/or rider, thereby allowing drivers of approaching vehicles to see and be aware of the horse and rider much farther in advance than is possible with reflector-based products.

While the present disclosure has been described in terms of exemplary aspects, those skilled in the art will recognize that the present disclosure can be practiced with modifications in the spirit and scope of the appended claims. These examples given above are merely illustrative and are not meant to be an exhaustive list of all possible designs, aspects, applications or modifications of the present disclosure.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A safety illumination device and system for a horse, comprising:
    a plurality of illumination units, the plurality of illumination units joined to form a light source unit, each illumination unit having an elongated form;
    a control module for controlling the illumination of the illumination units, the control module communicative coupled to each of the illumination units;
    the light source unit coupled to a mounting structure adapted to attaching directly onto a base structure mounted directly onto a base of a horse's tail, the base structure comprising an electrical box with a tail mounting structure including an aperture configured to allow a plurality of horse tail hairs to be brought through the tail mounting structure, the tail mounting structure secured to the base of the horse's tail; wherein each illumination unit comprises a series of light emitting diodes along a strand of rigidly flexible material having an end attached to the electrical box.

2. The safety illumination device of claim 1,
    the plurality of illumination units comprising at least six strands of rigidly flexible material holding a series of light-emitting diodes, whereby at least two strands have unequal lengths.

3. The safety illumination device of claim 1,
    the control module configured to cause the light source unit to illuminate in one or more patterns.

4. The safety illumination device of claim 1, the plurality of illumination units in a parallel arrangement when joined as the light source unit.

5. The safety illumination device of claim 4, whereby at least two of the plurality of illumination units have unequal lengths.

6. The safety illumination device of claim 5, whereby the unequal lengths are related to one or more lengths of the hairs comprising a horse's tail.

7. A safety illumination device and system for a horse, comprising:
    a plurality of illumination units, the plurality of illumination units joined to form a light source unit, each illumination unit having an elongated form, each illumination unit comprising a set of programmable light-emitting diodes coupled to the elongated form, the elongated form comprising a rigidly flexible material, the light source unit configured for mounting to a tail mounting structure including an aperture configured to allow a plurality of horse tail hairs to be brought through the tail mounting structure, the tail mounting structure secured to a base of a horse's tail;
    the plurality of illumination units in a parallel arrangement when joined as the light source unit, whereby at least two of the plurality of illumination units have unequal lengths;
    the plurality of illumination units controlled by a control module communicatively coupled one or more of the plurality of illumination units for controlling illumination of the light source; wherein said base structure comprises an electrical box with said tail mounting structure, each illumination unit having an end detachably connected to the electrical box.

8. The safety illumination device of claim 7, wherein said electrical box includes detachable connectors for detachably connecting said illumination units.

* * * * *